(12) United States Patent
Favresse et al.

(10) Patent No.: US 12,466,906 B2
(45) Date of Patent: Nov. 11, 2025

(54) DEFOAMER COMPOSITION BASED ON ORGANOFUNCTIONALLY MODIFIED POLYBUTADIENES

(71) Applicant: Evonik Operations GmbH, Essen (DE)

(72) Inventors: Philippe Favresse, Ratingen (DE); Alexander Schulz, Troisdorf (DE); Michael Fiedel, Essen (DE); Sarah Otto, Essen (DE); Frank Schubert, Neukirchen-Vluyn (DE); Thorsten Schierle, Essen (DE); Heike Semmler, Rheinberg (DE); Andreas Stüttgen, Hattingen (DE)

(73) Assignee: Evonik Operations GmbH, Essen (DE)

( * ) Notice: Subject to any disclaimer, the term of this patent is extended or adjusted under 35 U.S.C. 154(b) by 814 days.

(21) Appl. No.: 17/664,986

(22) Filed: May 25, 2022

(65) Prior Publication Data

US 2022/0389131 A1    Dec. 8, 2022

(30) Foreign Application Priority Data

May 27, 2021    (EP) .................. 21176163

(51) Int. Cl.
*C08F 36/06*    (2006.01)
*C09D 11/106*    (2014.01)

(52) U.S. Cl.
CPC ............ *C08F 36/06* (2013.01); *C09D 11/106* (2013.01); *C08F 2810/00* (2013.01)

(58) Field of Classification Search
CPC ..... C08F 36/06; C08F 2810/00; C09D 11/106
See application file for complete search history.

(56) References Cited

U.S. PATENT DOCUMENTS

| | | | |
|---|---|---|---|
| 3,725,492 A | 4/1973 | Ukita et al. | |
| 4,182,814 A | 1/1980 | Bernemann et al. | |
| 4,239,807 A | 12/1980 | Feldmann et al. | |
| 6,218,477 B1 | 4/2001 | Paulen et al. | |
| 6,353,060 B1 | 3/2002 | Paulen et al. | |
| 7,442,724 B2 | 10/2008 | Esselborn et al. | |
| 8,993,706 B2 | 3/2015 | Schubert et al. | |
| 9,441,145 B2 | 9/2016 | Schubert et al. | |
| 9,738,797 B2 | 8/2017 | Nilewski et al. | |
| 10,851,189 B2 | 12/2020 | Krannig et al. | |
| 11,365,270 B2 | 6/2022 | Krannig et al. | |
| 2005/0085563 A1 | 4/2005 | Esselborn et al. | |
| 2006/0020082 A1* | 1/2006 | Rautschek ............. | C11D 3/373 524/860 |
| 2011/0042004 A1 | 2/2011 | Schubert et al. | |
| 2013/0217930 A1 | 8/2013 | Haensel et al. | |
| 2013/0281552 A1 | 10/2013 | Nilewski et al. | |
| 2015/0159068 A1 | 6/2015 | Schubert et al. | |
| 2015/0307640 A1 | 10/2015 | Berlineanu et al. | |
| 2019/0315895 A1 | 10/2019 | Krannig et al. | |
| 2021/0024666 A1 | 1/2021 | Krannig et al. | |
| 2021/0206972 A1 | 7/2021 | Schulz et al. | |
| 2022/0047969 A1 | 2/2022 | Schierle et al. | |
| 2023/0018204 A1 | 1/2023 | Schubert et al. | |

FOREIGN PATENT DOCUMENTS

| | | |
|---|---|---|
| DE | 2053484 | 5/1972 |
| DE | 2158878 | 6/1973 |
| DE | 2526366 | 12/1976 |
| DE | 2731067 | 1/1979 |
| EP | 1 634 940 | 3/2006 |
| EP | 2 653 205 | 10/2013 |
| JP | 2002105209 A * | 4/2002 |
| WO | 2010/046181 | 4/2010 |
| WO | 2014/001300 | 1/2014 |
| WO | 2014/075901 | 5/2014 |
| WO | 2022/073823 | 4/2022 |

OTHER PUBLICATIONS

English translation of JP-2002105209 (Year: 2002).*

(Continued)

*Primary Examiner* — Catherine S Branch
*Assistant Examiner* — Andrea Wu
(74) *Attorney, Agent, or Firm* — Grüneberg and Myers PLLC

(57) ABSTRACT

A defoamer composition contains a compound based on polybutadiene having at least one repeat unit selected from the divalent radicals:

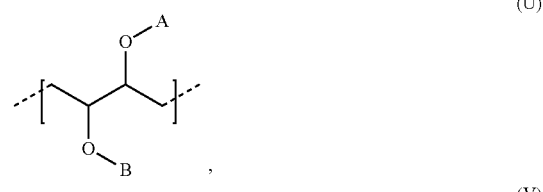

(U)

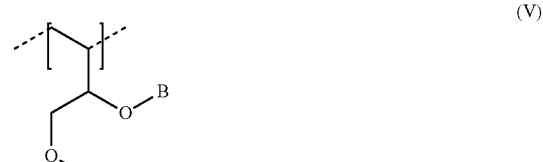

(V)

, or

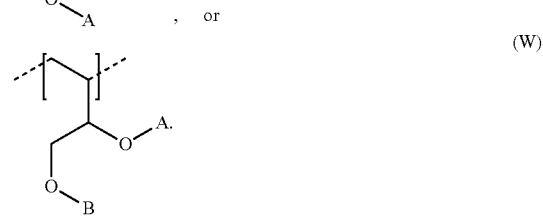

(W)

21 Claims, No Drawings

(56) References Cited

OTHER PUBLICATIONS

Lobert et al., U.S. Appl. No. 18/564,035, filed Nov. 24, 2023.
U.S. Appl. No. 18/564,035, filed Nov. 24, 2023, Lobert et al.
European Search Report dated Nov. 25, 2021 in European Application No. 21176163.0, 5 pages.
Evonik Operations: Product Information POLYVEST 130, "Non-functionalized Liquid Polybutadiene" General Description, Jan. 26, 2021, 4 pp.
Gao et al., "Facile Synthesis of Amphiphilic Heterografted Copolymers with Crystalline and Amorphous Side Chains", Macromolecular Chemistry and Physics, vol. 214, 2013, pp. 1677-1687.
U.S. Office Action dated Jun. 23, 2023, in U.S. Appl. No. 17/756,423, 14 pages.
U.S. Appl. No. 17/756,423, filed May 25, 2022, 2023/0018204, Schubert et al.
U.S. Appl. No. 13/771,973, filed Feb. 20, 2013, 2013/0217930, Haensel et al.
U.S. Appl. No. 17/126,172, filed Dec. 18, 2020, 2021/0206972, Schulz et al.
U.S. Appl. No. 17/399,276, filed Aug. 11, 2021, 2022/0047969, Schierle et al.
Lobert et al., U.S. Appl. No. 18/563,143, filed Nov. 21, 2023.
U.S. Appl. No. 18/563,143, filed Nov. 21, 2023, Lobert et al.

\* cited by examiner

DEFOAMER COMPOSITION BASED ON ORGANOFUNCTIONALLY MODIFIED POLYBUTADIENES

CROSS-REFERENCE TO RELATED APPLICATIONS

This application claims priority to European Application No. 21176163.0, filed on May 27, 2021, the content of which is hereby incorporated by reference in its entirety.

BACKGROUND OF THE INVENTION

Field of the Invention

The present invention relates to a defoamer composition comprising a compound based on polybutadiene.

The term "defoamer" in the present case encompasses both products and formulations that prevent foam and also those that destroy foam and enable deaeration. In practice, the transitions between these product properties are blurred, so that here the common collective term defoamer is used.

Description of Related Art

In many industrial processes, in particular when work is being carried out in aqueous media, it is necessary to suppress or to completely prevent the undesired formation of foam during the production or processing operations, since foam or heads or froth which form during stirring and dispersing operations or form in the containers during the filling operation can lengthen the production times or reduce the effective volume of the plant or even prevent correct operation thereof, in that overflowing of the formulation out of the mixing tank cannot be avoided and a lack of colour transfer during the application thereof is unavoidable.

This can be achieved by adding defoamers which even at very low application concentrations of from approximately 0.001% by weight are capable of avoiding or destroying undesired foams and which at the same time do not cause any surface defects after application of the systems and suppress air inclusions in the paint. In practice, these aspects must be taken into account at least just as much as good defoaming.

Surface defects are to be understood to be features that are undesirable to the user such as for example pinholes, craters, loss of gloss, orange peel effect, wrinkling and loss of adhesion in the coating system. However, an appropriate long-term stability of the defoamer in formulations is also of high importance to the user since products such as paints are often not used up immediately but instead sometimes only after a relatively long storage. In the case of storage under extreme climatic conditions (heat and solar irradiation), the efficacy of a defoamer formulation can occasionally collapse after only a short time.

Typical active ingredients for the formulation of defoamers are polysiloxanes, mineral and vegetable oils or polymers. It is known that combination of the active ingredients with one another but also addition of finely divided hydrophobic solids, for example silicas, make it possible to formulate particularly effective defoamers tailored to specific applications.

Defoamers for defoaming aqueous and non-aqueous media and comprising polyoxyalkylene polysiloxane polymers as the active agent with a crucial influence on the defoaming exhibit particular efficacy and storage stability. This includes foam inhibition, defoaming, very good long-term stability, and also outstanding compatibility in aqueous and non-aqueous media. All of these properties are of high importance for modern paint applications.

It is therefore known to those skilled in the art that polyether-modified siloxanes are very effective defoamer active ingredients. These may be used in the form of the pure substance or else in formulated form. Polyether siloxanes suffer increasing regulatory pressure due to the presence of traces of cyclic siloxanes related to their production, since recently these have been identified in Europe as "Substances of very high concern" (SVHC) by the ECHA due to their persistent, bioaccumulative and toxic (PBT) and very persistent and very bioaccumulative properties (vPvB). The presence of cyclic siloxanes at concentrations ≥0.1% by weight therefore results in appropriate labelling, which highly restricts the marketing opportunities in Europe. Experience has also shown that it is to be expected that other global state regulations will match the European view, which further limits marketing reach.

The success of siloxane-based defoamers is based on their broad adjustability in terms of (physico)chemical properties, which results in broad material diversity due to topological effects of the siloxane, but also on the choice of the organic polymer modification and the density of functionality thereof on the siloxane backbone. In the simplest model representation of defoamer action, the defoamer must be incompatible with the surrounding matrix. Its surface-active potential allows it to then move to the nearest "liquid-gas bubble" interface, then to penetrate this and, when spreading out along the interface, to force the gas bubble to burst. In this model representation, therefore, the (in)solubility of the defoamer with respect to the surrounding medium plays a critical role. The specific adjustability of the hydrophilcity (by the polyether) and the hydrophobicity (by the siloxane structure) enables a customized adjustment to the defoamer capacity for the respective matrix system. Furthermore, compatibility of the defoamer with other substances present in the application is essential. For instance, a defoamer must not be so incompatible in the range of colour and paint applications that it generates paint defects, which adversely affect the application image, but rather leads to a satisfactory end result in terms of application technology.

Silicone-free defoamers, for example polybutadienes, are also known from the prior art. The disadvantage of these lies in the constraints of the adjustability of the compatibility.

It is therefore desirable to provide a silicone-free defoamer composition which allows broad adjustment of the defoamer performance and compatibility, and overcomes at least one disadvantage of the prior art.

SUMMARY OF THE INVENTION

To achieve the object, therefore, a defoamer composition is proposed comprising a compound based on polybutadiene having at least one repeat unit selected from the group consisting of the divalent radicals

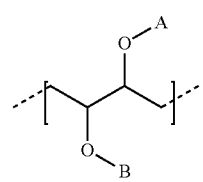

(U)

-continued

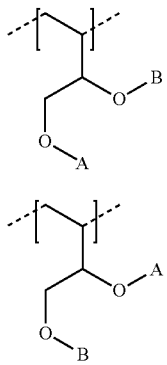

wherein

A is in each case independently a monovalent organic radical or a hydrogen radical, preferably in each case independently selected from the group consisting of monovalent hydrocarbon radicals having 1 to 6 carbon atoms,
more preferably in each case independently selected from the group consisting of alkyl radicals having 1 to 4 carbon atoms;

B is in each case independently selected from the group consisting of radicals of the formula (4a)

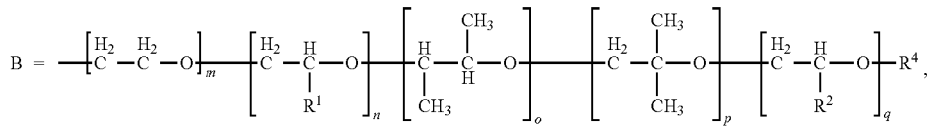

Formula (4a)

preferably in each case independently selected from the group consisting of radicals of the formula (4b)

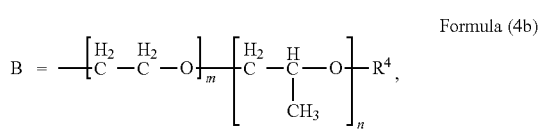

Formula (4b)

more preferably in each case independently selected from the group consisting of radicals of the formula (4c)

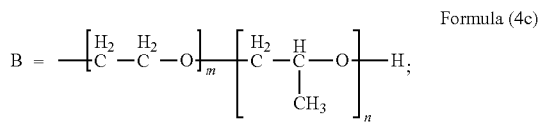

Formula (4c)

$R^1$ is in each case independently selected from the group consisting of monovalent hydrocarbon radicals having 1 to 16 carbon atoms,
preferably in each case independently an alkyl radical having 1 to 16 carbon atoms or a phenyl radical,
more preferably in each case independently a methyl radical, an ethyl radical or a phenyl radical;

$R^2$ is a radical of the formula $-CH_2-O-R^3$;

$R^3$ is in each case independently selected from the group consisting of monovalent hydrocarbon radicals having 3 to 18 carbon atoms;
preferably each independently an allyl radical, a butyl radical, an alkyl radical having 8 to 15 carbon atoms or a phenyl radical that may be substituted by monovalent radicals selected from hydrocarbon radicals having 1 to 4 carbon atoms;
more preferably a tert-butylphenyl radical or an o-cresyl radical;

$R^4$ is each independently a monovalent organic radical having 1 to 18 carbon atoms or hydrogen, preferably hydrogen;

and m, n, o, p and q are each independently 0 to 300, preferably 0 to 200, more preferably 0 to 100, with the proviso that the sum total of m, n, o, p and q is greater than 1, preferably greater than 5, more preferably greater than 10;

the B radical has at least one repeat unit in accordance with

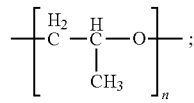

including every permutation of the repeat units in the B radical.

The invention also includes the following embodiments:

1. Defoamer composition comprising a compound based on polybutadiene having at least one repeat unit selected from the group consisting of the divalent radicals

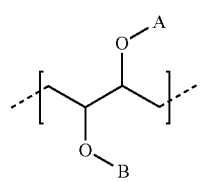

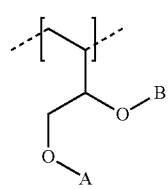

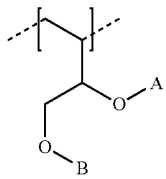

(W)

wherein

A is in each case independently a monovalent organic radical or a hydrogen radical, preferably in each case independently selected from the group consisting of monovalent hydrocarbon radicals having 1 to 6 carbon atoms,
more preferably in each case independently selected from the group consisting of alkyl radicals having 1 to 4 carbon atoms;

B is in each case independently selected from the group consisting of radicals of the formula (4a)

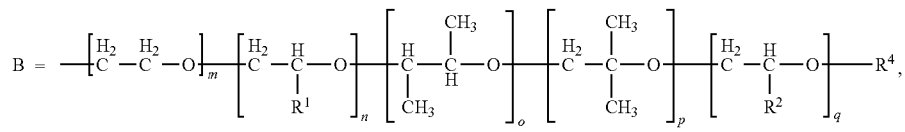

Formula (4a)

preferably in each case independently selected from the group consisting of radicals of the formula (4b)

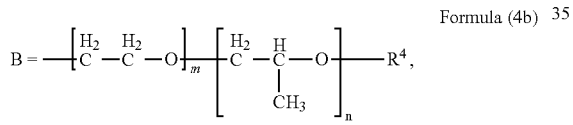

Formula (4b)

more preferably in each case independently selected from the group consisting of radicals of the formula (4c)

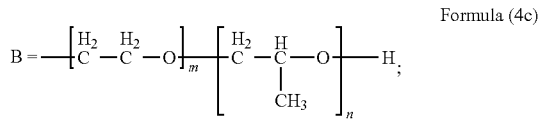

Formula (4c)

$R^1$ is in each case independently selected from the group consisting of monovalent hydrocarbon radicals having 1 to 16 carbon atoms,
preferably in each case independently an alkyl radical having 1 to 16 carbon atoms or a phenyl radical,
more preferably in each case independently a methyl radical, an ethyl radical or a phenyl radical;

$R^2$ is a radical of the formula $-CH_2-O-R^3$;

$R^3$ is in each case independently selected from the group consisting of monovalent hydrocarbon radicals having 3 to 18 carbon atoms;
preferably each independently an allyl radical, a butyl radical, an alkyl radical having 8 to 15 carbon atoms or a phenyl radical that may be substituted by monovalent radicals selected from hydrocarbon radicals having 1 to 4 carbon atoms;
more preferably a tert-butylphenyl radical or an o-cresyl radical;

$R^4$ is each independently a monovalent organic radical having 1 to 18 carbon atoms or hydrogen, preferably hydrogen;

and m, n, o, p and q are each independently 0 to 300, preferably 0 to 200, more preferably 0 to 100, with the proviso that the sum total of m, n, o, p and q is greater than 1, preferably greater than 5, more preferably greater than 10;

the B radical has at least one repeat unit in accordance with

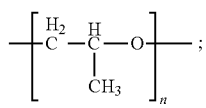

including every permutation of the repeat units in the B radical.

2. Composition according to embodiment 1, characterized in that m, n, o, p and q are each independently 0 to 300, preferably 0 to 200, more preferably 0 to 100, with the proviso that the sum total of m, n, o, p and q is greater than 1, preferably greater than 5, more preferably greater than 10.

3. Composition according to either of the preceding embodiments, characterized in that the number-average molar mass $M_n$ of the polybutadiene moiety is from 200 g/mol to 20 000 g/mol, preferably from 500 g/mol to 10 000 g/mol, more preferably from 700 g/mol to 5000 g/mol.

4. Composition according to any of the preceding embodiments, characterized in that the polybutadiene moiety has 0% to 80%, preferably 0% to 30%, more preferably 0% to 10%, especially preferably 0% to 5% of the double bonds present as 1,2 vinyl double bonds, and 20% to 100%, preferably 70% to 100%, more preferably 90% to 100%, especially preferably 95% to 100% of the double bonds present as 1,4 double bonds.

5. Composition according to any of the preceding embodiments, characterized in that the compound was prepared based on linear polybutadienes.

6. Composition according to any of the preceding embodiments, characterized in that the compound has no (in comb position) polybutadienes.

7. Composition according to any of the preceding embodiments, characterized in that the compound has exclusively pendant (in comb position) repeat units (U), (V) and/or (W).

8. Composition according to any of the preceding embodiments, characterized in that the average molar mass of the B radical is from 40 g/mol to 20 000 g/mol, preferably from 100 g/mol to 15 000 g/mol, more preferably from 200 g/mol to 10 000 g/mol.

9. Composition according to any of the preceding embodiments, characterized in that 2 to 100% by weight, preferably 5-70% by weight, more preferably 5-30% by weight of the compound is used, based on the total composition.
10. Composition according to any of the preceding embodiments, characterized in that said composition comprises at least one emulsifier, preferably selected from the group of the anionic, cationic or non-ionic emulsifiers or mixtures thereof.
11. Composition according to any of the preceding embodiments, characterized in that said composition has a viscosity, measured in a 5% aqueous solution at 20° C. to DIN 53015, of 50-5000 mPa s, preferably 100-2000 mPa s and more preferably 100-1000 mPa s.
12. Composition according to any of the preceding embodiments, characterized in that said composition comprises at least one thickener, preferably selected from the group consisting of associative thickeners such as hydrophobically modified polyacrylates (HASE), hydrophobically modified cellulose ethers (HMHEC), hydrophobically modified polyacrylamides (HMPAM), hydrophobically modified polyethers (HMPE) and associative polyurethane thickeners, modified celluloses, organic polymers such as polyvinyl alcohols, polyacrylic acid and polymethacrylic acids, polyacrylamides, polyvinylpyrrolidone and polyethylene glycols, natural thickeners such as starch, gelatins, casein or konjac flour and also chemically modified types thereof, and organic thickeners such as metal soaps, hardened castor oil and alkoxylates thereof and chemically modified fat derivatives or else inorganic compounds such as sheet silicates (bentonite, hectorite) or (hydrated) SiO2 particles, which may also be modified.
13. Composition according to any of the preceding embodiments, characterized in that said composition comprises at least one solid, preferably selected from the group consisting of silicas, which may be present in modified or unmodified form, or (alkaline earth) alkali metal soaps such as calcium stearate, or others and mixtures thereof.
14. Use of the composition according to any of the preceding embodiments as a defoamer additive, as a flow control additive and/or as a substrate wetting additive.
15. Use of the composition according to any of the preceding embodiments for preparing dispersions, millbases, paints, coatings or printing inks, inkjets, grind resins, pigment concentrates, colour preparations, pigment preparations, filler preparations or coating compositions.
16. Use of a compound based on polybutadienes according to any of embodiments 1-8 for preparing a defoamer composition.

DETAILED DESCRIPTION OF THE INVENTION

In the context of the present invention the terms medium, coating system, coating or paint formulation, coating recipe and coating composition are to be understood as being synonymous. They are systems to be defoamed.

The subject matter of the invention is described by way of example below but without any intention that the invention be restricted to these illustrative embodiments. Where ranges, general formulae or classes of compounds are specified below, these are intended to encompass not only the corresponding ranges or groups of compounds that are explicitly mentioned but also all subranges and subgroups of compounds that can be obtained by removing individual values (ranges) or compounds. Where documents are cited in the context of the present description, the entire content thereof is intended to be part of the disclosure content of the present invention.

Where average values are stated hereinbelow, these values are numerical averages unless otherwise stated. Where measured values, parameters or material properties determined by measurement are stated hereinbelow, these are, unless otherwise stated, measured values, parameters or material properties measured at 25° C. and preferably at a pressure of 101 325 Pa (standard pressure).

Where numerical ranges in the form "X to Y" are stated hereinbelow, where X and Y represent the limits of the numerical range, this is synonymous with the statement "from at least X up to and including Y", unless otherwise stated. Stated ranges thus include the range limits X and Y, unless otherwise stated.

Wherever molecules/molecule fragments have one or more stereocentres or can be differentiated into isomers on account of symmetries or can be differentiated into isomers on account of other effects, for example restricted rotation, all possible isomers are included by the present invention.

All formulae describe compounds or radicals that are constructed from repeat units, for example repeat fragments, blocks or monomer units, and can have a molar mass distribution. The frequency of the repeat units is stated in the form of indices. The indices used in the formulae should be regarded as statistical averages (numerical averages). The indices used and also the value ranges of the reported indices should thus be regarded as averages or the possible statistical distribution of the structures that are actually present and/or mixtures thereof. The various fragments or repeat units of the compounds described in the formulae may be distributed statistically. Statistical distributions have a blockwise structure with any number of blocks and any sequence or are subject to a randomized distribution; they may also have an alternating structure or else form a gradient along the chain, where one is present; in particular they can also give rise to any mixed forms in which groups having different distributions may optionally follow one another. The formulae below include all permutations of repeat units. Where compounds such as polybutadienes (A), epoxy-functional polybutadienes (C), hydroxy-functional polybutadienes (E), polyether-modified polybutadienes (G) or polyether-modified polybutadienes (K) comprising end-capped polyether radicals, that can have multiple instances or different units, are described in the context of the present invention, these may thus occur in these compounds either in an unordered manner, for example in statistical distribution, or in an ordered manner. The figures for the number or relative frequency of units in such compounds should be regarded as an average (numerical average) over all the corresponding compounds. Specific embodiments may lead to restrictions on statistical distributions as a result of the embodiment. For all regions unaffected by such restriction, the statistical distribution is unchanged. Defoamer and defoamer active ingredient are understood to be synonymous.

Surprisingly, it has been found that the defoamer composition according to the invention comprises a compound that advantageously is not based on silicone and also presents the possibility of adjusting the defoamer effect and compatibility. Firstly, the diversity of the polybutadiene could be utilized; secondly, by combining certain topologically different polyethers and the density of functionality thereof on the polybutadiene skeleton, the compatibility could be improved.

Surprisingly, it was also established that at least one B radical has at least one repeat unit in accordance with

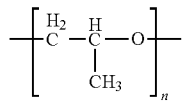

in order to achieve both a satisfactory defoamer effect and a satisfactory compatibility of the composition according to the invention.

The term "defoaming" is often used to describe the removal of gas bubbles from the coating. However, in certain cases a distinction should be made between "defoaming" and "deaerating". The gas bubbles must first reach the surface. The removal of the foam bubbles which then takes place at the surface is referred to as defoaming. Defoamers are only active at the surface where they remove air bubbles present there. By contrast, deaerators must be active in the entire coating film. Foam on the surface. Defoamers destabilize the foam bubbles. Air inclusions in the coating film. Deaerators accelerate migration of the bubbles to the surface.

The composition according to the invention preferably comprises the compound where m, n, o, p and q are each independently 0 to 300, preferably 0 to 200, more preferably 0 to 100, with the proviso that the sum total of m, n, o, p and q is greater than 1, preferably greater than 5, more preferably greater than 10.

The composition according to the invention particularly preferably comprises the compound where m, n, o, p and q are each independently 0 to 200, preferably 0 to 100, more preferably 0 to 50, with the proviso that the sum total of m, n, o, p and q is greater than 1, preferably greater than 5, more preferably greater than 10.

The compound for the composition according to the invention preferably has a number-average molar mass $M_n$ of the polybutadiene moiety of 200 g/mol to 20 000 g/mol, preferably from 500 g/mol to 10 000 g/mol, more preferably from 700 g/mol to 5000 g/mol.

For the composition according to the invention, the polybutadiene moiety of the compound has 0% to 80%, preferably 0% to 30%, more preferably 0% to 10%, especially preferably 0% to 5% of the double bonds present as 1,2 vinyl double bonds, and 20% to 100%, preferably 70% to 100%, more preferably 90% to 100%, especially preferably 95% to 100% of the double bonds present as 1,4 double bonds.

For the composition according to the invention, the compound was preferably prepared based on linear polybutadienes.

For the composition according to the invention, the compound preferably has no pendant (in comb position) polybutadienes.

The compound preferably has exclusively pendant (in comb position) repeat units (U), (V) and/or (W).

The average molar mass of the B radical of the compound is preferably from 40 g/mol to 20 000 g/mol, preferably from 100 g/mol to 15 000 g/mol, more preferably from 200 g/mol to 10 000 g/mol.

The radicals $R^1$, $R^2$, $R^3$ and $R^4$ may each independently be linear or branched, saturated or unsaturated, aliphatic or aromatic, and substituted or unsubstituted.

The general notation

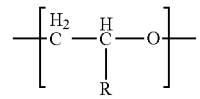

with $R=R^1$ or $R^2$ in formula (4a) or $R=CH_3$ in the formulae (4b) and (4c) represents either a unit of the formula

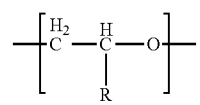

or a unit of the formula

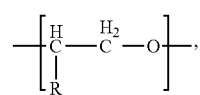

but preferably a unit of the formula

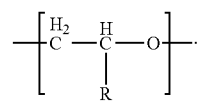

The general notation

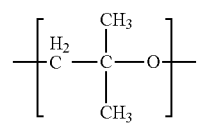

in formula (4a) represents either a unit of the formula

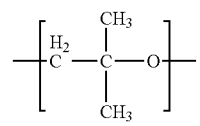

or a unit of the formula

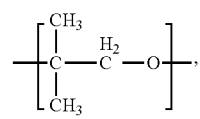

but preferably a unit of the formula

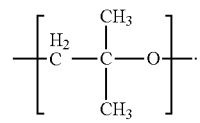

It is further preferable that the $R^4$ radical is in each case independently selected from the group consisting of monovalent hydrocarbon radicals having 1 to 18 carbon atoms, acyl radicals —C(=O)$R^6$, urethane radicals —C(=O)NH—$R^6$, carbonate radicals —C(=O)O—$R^7$ and hydrogen; $R^4$ is further preferably in each case independently selected from the group consisting of alkyl radicals having 1 to 18 carbon atoms, alkylene radicals having 1 to 18 carbon atoms, acyl radicals —C(=O)$R^5$, urethane radicals —C(=O)NH—$R^6$, carbonate radicals —C(=O)O—$R^7$ and hydrogen; more preferably. $R^4$ is hydrogen.

$R^5$ is in each case independently an alkyl or alkenyl radical having 1 to 18 carbon atoms, preferably having 1 to 10 carbon atoms, more preferably a methyl radical.

$R^6$ is in each case independently an alkyl or aryl radical having 1 to 18 carbon atoms, preferably having 6 to 18 carbon atoms.

$R^7$ is each independently an alkyl radical having 1 to 18 carbon atoms, preferably having 1 or 2 carbon atoms.

The compound preferably also comprises repeat units (Y) and (Z) in accordance with

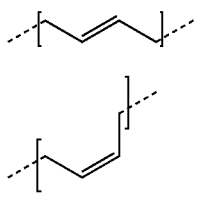

It is preferable here that the sum total of all repeat units (U), (V) and (W) divided by the sum total of all repeat units (U), (V), (W), (X), (Y) and (Z) in the at least one polyether-modified polybutadiene (G) or (K) is from >0% to 70%, preferably from 1% to 50%, more preferably from 2% to 40%, even more preferably from 3% to 30%, especially preferably from 4% to 20%.

This means that >0% to 70%, preferably 1% to 50%, more preferably from 2% to 40%, even more preferably from 3% to 30%, especially preferably from 4% to 20%, of the entirety of the repeat units (U), (V), (W), (X), (Y) and (Z) are polyether-modified.

The number-average molar mass $M_n$, weight-average molar mass $M_w$ and polydispersity of the polybutadiene moiety of the polyether-modified polybutadiene (G) or (K) are freely variable. The polybutadiene moiety is understood to mean the component of the polyether-modified polybutadiene (G) or (K) that originates from the polybutadiene (A) used in the process.

It is preferable that the number-average molar mass $M_n$ of the polybutadiene moiety of the polyether-modified polybutadiene (G) or (K) is from 200 g/mol to 20 000 g/mol, preferably from 500 g/mol to 10 000 g/mol, more preferably from 700 g/mol to 5000 g/mol.

Alternatively, it is preferable that the number-average molar mass $M_n$ of the polybutadiene moiety of the polyether-modified polybutadiene (G) or (K) is from 2100 g/mol to 20 000 g/mol, more preferably from 2200 g/mol to 10 000 g/mol, most preferably from 2300 g/mol to 5000 g/mol.

The number-average molar mass $M_n$ of the polybutadiene moiety is defined here as the number-average molar mass $M_n$ of the underlying polybutadiene (A).

It is further preferable that the polyether-modified polybutadiene (G) or (K) has 5 to 360, more preferably 10 to 180, most preferably 15 to 90, repeat units, where the repeat units are selected from the group consisting of (U), (V), (W), (X), (Y) and (Z).

Alternatively, it is preferable that the polyether-modified polybutadiene (G) or (K) has 35 to 360, more preferably 40 to 180, most preferably 45 to 90, repeat units, where the repeat units are selected from the group consisting of (U), (V), (W), (X), (Y) and (Z).

It is further preferable that the polyether-modified polybutadienes (G) or (K) are characterized in that 0% to 80%, preferably 0% to 30%, more preferably 0% to 10% and especially preferably 0% to 5% of the double bonds present are 1,2 vinyl double bonds, and 20% to 100%, preferably 70% to 100%, more preferably 90% to 100% and especially preferably 95% to 100% of the double bonds present are 1,4 double bonds.

Especially preferred are those polyether-modified polybutadienes (G) or (K) which are derived from the polybutadienes Polyvest® 110 and Polyvest® 130 from Evonik Industries AG/Evonik Operations GmbH and Lithene ultra AL and Lithene ActiV 50 from Synthomer PLC described above.

The molar mass and polydispersity of the B radicals is freely variable. However, it is preferable that the average molar mass of the B radicals is from 100 g/mol to 20 000 g/mol, preferably from 200 g/mol to 15 000 g/mol, more preferably from 400 g/mol to 10 000 g/mol. The average molar mass of the B radicals may be calculated from the starting weight of the monomers used based on the number of OH groups of the hydroxy-functional polybutadiene (E) used. Thus, for example, if 40 g of ethylene oxide is used and the amount of the hydroxy-functional polybutadiene (E) used is 0.05 mol of OH groups, the average molar mass of the B radical is 800 g/mol.

The polyether-modified polybutadienes (G) or (K), according to the composition and molar mass, are liquid, pasty or solid.

The number-average molar mass $M_n$ of the polyether-modified polybutadienes (G) or (K) is preferably from 1000 g/mol to 6000 g/mol, further preferably from 1500 g/mol to 5000 g/mol, especially preferably from 2000 g/mol to 4000 g/mol.

Their polydispersity is variable within broad ranges. The polydispersity of the at least one polyether-modified polybutadiene (G) or (K), by the GPC method against PPG standard, is preferably $M_w/M_n = 1.5$ to 10, further preferably between 2 and 9, more preferably between 3 and 8.

Approaches to the compound based on polybutadiene having at least one repeat unit selected from the group consisting of the divalent radicals (U), (V) and/or (W), as described above, can be taken from the as yet unpublished European patent application EP 19212066.5 or PCT/EP2020/083013.

The as yet unpublished European patent application EP 19212068.5 or PCT/EP2020/083013 addresses the preparation of compounds based on polybutadienes that are suitable for the defoamer composition according to the invention. A process is described therein comprising the following steps:
  a) reacting at least one polybutadiene (A) with at least one epoxidizing reagent (B) to give at least one epoxy-functional polybutadiene (C);
  b) reacting the at least one epoxy-functional polybutadiene (C) with at least one hydroxy-functional compound (D) to give at least one hydroxy-functional polybutadiene (E);

c) reacting the at least one hydroxy-functional polybutadiene (E) with at least one epoxy-functional compound (F) to give at least one polyether-modified polybutadiene (G).

It has been disclosed therein that, surprisingly, polybutadienes having a high proportion of 1,4 units and a low content of vinylic 1,2 units, after epoxidation with hydrogen peroxide, can readily be reacted under acid-catalysed ring-opening with OH-functional compounds to give pendantly OH-functional polybutadienes (polybutadienols) and can then be alkoxylated with alkylene oxides.

It is preferable that the process additionally includes at least one of the following optional steps:

d) reacting the at least one polyether-modified polybutadiene (G) with at least one end-capping reagent (H) to give at least one polyether-modified polybutadiene (K) containing end-capped polyether radicals;

e) lightening the colour of the at least one polyether-modified polybutadiene (G) or (K).

The process is preferably further characterized in that

In step a) >0% to 70%, preferably 1% to 50%, more preferably 2% to 40%, even more preferably 3% to 30% and especially preferably 4% to 20% of the double bonds of the at least one polybutadiene (A) are epoxidized with the aid of performic acid, which is produced in situ from formic acid and $H_2O_2$;

in step b) one or more short-chain alcohols having 1 to 6 carbon atoms, especially isobutanol, are added onto the epoxy groups of the at least one epoxy-functional polybutadiene (C) under ring opening, preferably using one or more acidic catalysts, especially trifluoromethanesulfonic acid;

in step c) one or more epoxy-functional compounds (F) selected from alkylene oxides and optionally further epoxy-functional monomers are added onto the resultant pendant OH groups of the at least one hydroxy-functional polybutadiene (E) in an alkoxylation reaction, preferably additionally using a Zn/Co double metal cyanide catalyst or basic catalysts such as amines, guanidines, amidines, alkali metal hydroxides or alkali metal alkoxides;

in step d) optionally the at least one polyether-modified polybutadiene (G) is reacted with at least one endcapping reagent (H), selected from the group of carboxylic acids, carboxylic anhydrides, halogenated hydrocarbons, isocyanates and carbonates to give at least one polyether-modified polybutadiene (K) comprising end-capped polyether radicals;

in step e) optionally the colour lightening of the at least one polyether-modified polybutadiene (G) or (K) using activated carbon and/or hydrogen peroxide is carried out.

The process disclosed therein makes it possible for the first time to modify linear polybutadienes by a simple direct alkoxylation on the pendant OH groups with polyether radicals in comb positions. The chain length and monomer sequence in the polyether radical may be varied within wide ranges. The average number of polyether radicals bonded to the polybutadiene is adjustable in a controlled manner via the degree of epoxidation and the hydroxy functionalization, and opens up a great structural variety in the hydroxy-functional polybutadienes (E).

The polybutadienes having polyether radicals in comb positions that are obtainable in accordance with the invention are preferably essentially free of residual epoxy groups. The process product according to the invention preferably contains essentially no free polyether components. Preferably, essentially all polyethers are chemically attached to the polybutadiene via an ether bond. The process products according to the invention are thus distinctly different from the compounds known today from the prior art by virtue of their elevated purity.

In order to avoid repetition of the preferred configurations of the preparation process of the as yet unpublished European patent application EP 19212068.5 or PCT/EP2020/083013, reference is hereby made to the dedicated description of the headings of the individual process steps:

The preferred configuration of step a) of the process according to the invention The preferred configuration of step b) of the process according to the invention The preferred configuration of step c) of the process according to the invention DMC catalysis Base catalysis Products as starters Optional step d)

Optional step e)

Reactors

For the composition according to the invention, preferably described in detail here is step c) for preparing said compound:

In step c) of the process according to the invention, the at least one hydroxy-functional polybutadiene (E) is reacted with at least one epoxy-functional compound (F) to give at least one polyether-modified polybutadiene (G).

The at least one hydroxy-functional polybutadiene (E) from step b) serves, in step c), as starter compound for the reaction with the at least one epoxy-functional compound (F). Under ring opening and preferably in the presence of a suitable catalyst, the at least one epoxy-functional compound (F) (also referred to hereinafter simply as "monomer" or "epoxy monomer" or "epoxide") is added onto the OH groups of the at least one hydroxy-functional polybutadiene (E) in a polyaddition reaction. This leads to the formation of the polybutadienes according to the invention with polyether chains in comb (pendant) positions, i.e. to the formation of the at least one polyether-modified polybutadiene (G). The polyether-modified polybutadiene (G) is preferably a linear polybutadiene which has been modified with polyether radicals in comb (pendant) positions, it is thus preferable that the polyether-modified polybutadiene (G) has a linear polybutadiene backbone and pendant polyether radicals.

The reaction in step c) Is preferably an alkoxylation reaction, i.e. a polyaddition of alkylene oxides onto the at least one hydroxy-functional polybutadiene (E). However, the reaction in step c) may also be conducted with glycidyl compounds alternatively or additionally to the alkylene oxides.

It is therefore preferable that the at least one epoxy-functional compound used in step c) is selected from the group of the alkylene oxides, preferably from the group of the alkylene oxides having 2 to 18 carbon atoms, further preferably from the group of the alkylene oxides having 2 to 8 carbon atoms, especially preferably from the group consisting of ethylene oxide, propylene oxide, 1-butylene oxide, cis-2-butylene oxide, trans-2-butylene oxide, isobutylene oxide and styrene oxide; and/or in that the at least one epoxy-functional compound used in step c) is selected from the group of the glycidyl compounds, preferably from the group of the monofunctional glycidyl compounds, more preferably from the group consisting of phenyl glycidyl ether, o-cresyl glycidyl ether, tert-butylphenyl glycidyl ether, allyl glycidyl ether, butyl glycidyl ether, 2-ethylhexyl glycidyl ether, C12/C14 fatty alcohol glycidyl ether and C13/C15 fatty alcohol glycidyl ether.

Alternatively or in addition to the above alkylene oxides or glycidyl compounds, it is also possible to use cyclic anhydrides, lactones, dilactides or cyclic carbonates as monomers or comonomers with the alkylene oxides or glycidyl compounds already mentioned.

All cyclic anhydrides known to those skilled in the art, in pure form or in any desired mixtures, may generally be used. The saturated, unsaturated or aromatic cyclic dicarboxylic anhydrides are preferably succinic anhydride, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-, methylhexahydro- and methyltetrahydrophthalic anhydride. Particular preference is given to succinic anhydride, maleic anhydride, phthalic anhydride and hexahydrophthalic anhydride, especially maleic anhydride and phthalic anhydride.

All lactones known to those skilled in the art, in pure form or in any desired mixtures, may generally be used as lactones. Preference may be given to using valerolactones, caprolactones and butyrolactones, all of which may be unsubstituted or substituted by organic radicals, preferably methyl groups. Preference is given to ε-caprolactone or δ-valerolactone, especially ε-caprolactone.

As cyclic carbonates, it is generally possible to use all cyclic carbonates known to those skilled in the art, accessible via insertion of CO2 into epoxides, in pure form or in any desired mixtures. Carbonates derived from glycidyl ethers are preferably used, particular preference being given to propylene carbonate and ethylene carbonate.

The monomers may be added either individually in pure form, in alternating succession in any metering sequence, or else simultaneously in mixed form. The sequence of monomer units in the resulting polyether chain is thus subject to a blockwise distribution or a statistical distribution or a gradient distribution in the end product.

By the process according to the invention, pendant polyether chains are constructed on the polybutadiene, which are exemplified in that they can be prepared in a controlled and reproducible manner in terms of structure and molar mass.

The sequence of monomer units can be varied by the sequence of addition within broad limits.

The molar masses of the pendant polyether radicals may be varied within broad limits by the process according to the invention, and controlled specifically and reproducibly via the molar ratio of the added monomers in relation to the OH groups of the at least one initially charged hydroxy-functional polybutadiene (E) from step b).

The polyether-modified polybutadienes (G) prepared in accordance with the invention are preferably characterized in that they contain B radicals bonded to the polybutadiene skeleton via an ether group according to the formulae (3a), (3b) and (3c)

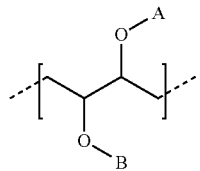

Formula (3a)

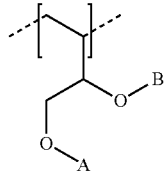

Formula (3b)

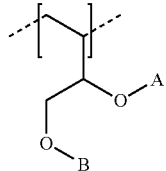

Formula (3c)

As set out above for step B), the A radical in the formulae (3a), (3b) and (3c) comes from the compound A-OH, i.e. the hydroxy-functional compound (D) used in step b). As has also been stated above, two cases are to be distinguished in step b), namely A≠H or A=H. In the first case, i.e. A≠H, the A radical in the formulae (3a), (3b) and (3c) is identical to the A radical in the formulae (2a), (2b) and (2c). In the second case, i.e. A=H, the A radical in the formulae (3a), (3b) and (3c) is in each case independently H or a B radical. If, for example, a monofunctional aliphatic alcohol having 1 to 6 carbon atoms is used as hydroxy-functional compound (D), A is an alkyl radical having 1 to 6 carbon atoms. If, for example, a carboxylic acid is used as hydroxy-functional compound (D), A is an acyl radical. If, however, water is used as hydroxy-functional compound (D), A in the formulae (3a), (3b) and (3c) is a B radical in the case of reaction with one or more epoxy-functional compounds (F); A remains hydrogen in the case that there is no reaction. Therefore, each pendant hydroxyl group converted results in exactly one pendant —O—B radical. The B radical is in turn composed of one or more monomers, preferably of two or more monomers, of the at least one epoxy-functional compound (F) used.

In the context of the invention, it is possible in principle to use all alkoxylation catalysts known to the person skilled in the art, for example basic catalysts such as alkali metal hydroxides, alkali metal alkoxides, amines, guanidines, amidines, phosphorus compounds such as triphenylphosphine, and additionally acidic and Lewis-acidic catalysts such as $SnCl_4$, $SnCl_2$, $SnF_2$, $BF_3$ and $BF_3$ complexes, and also double metal cyanide (DMC) catalysts.

Prior to the feeding of epoxide, i.e. prior to the addition of the at least one epoxy-functional compound (F) used, the reactor partly filled with the starter and catalyst is inertized, for example with nitrogen. This is accomplished, for example, by repeated alternating evacuation and supply of nitrogen. It is advantageous to evacuate the reactor to below 200 mbar after the last injection of nitrogen. This means that the addition of the first amount of epoxy monomer preferably takes place into the evacuated reactor. The monomers are dosed while stirring and optionally cooling in order to remove the heat of reaction released and to maintain preselected reaction temperature. The starter used is the at least one hydroxy-functional polybutadiene (E), or else it is possible to use a polyether-modified polybutadiene (G) prepared by the process of the invention as starter, as described further below.

It is possible to add further additives to the composition according to the invention, for instance polyethers, oils of natural and synthetic origin, organic polymers, organomodified silicone polymers and solids. An example of such a suitable finely divided solid is high-dispersity pyrogenic or wet-chemistry derived silica which is commercially available as Aerosil or Sipernat and may be hydrophobized by treatment with organosilicon compounds. Further suitable solids are metal soaps such as magnesium, aluminium and calcium soaps and also polyethylene and amide waxes or ureas.

Preference is given to using 2 to 100% by weight, preferably 5-70% by weight, more preferably 5-30% by weight of the compound, based on the total composition.

It is likewise conceivable that further solids, for example silica, waxes and solids may be added to further increase the defoaming activity. Such additives are known to those skilled in the art. At least one solid may preferably be used, preferably selected from the group consisting of silicas, which may be present in modified or unmodified form, or (alkaline earth)/alkali metal soaps such as calcium stearate and mixtures thereof.

The addition of emulsifiers for preparing a defoamer emulsion starting from the composition according to the invention is also preferably possible. Here, preference may be given to using commercial emulsifiers, preferably anionic, cationic or non-ionic emulsifiers or mixtures thereof. Also known are specific emulsifier systems which may also be used.

Preferably, emulsifier systems having a viscosity of 50 to 5000 mPa s, preferably 100 to 2000 mPa s, more preferably 100 to 1000 mPa s, measured in a 5% aqueous solution in accordance with DIN 53015, are suitable for the preparation of a defoamer emulsion according to the invention.

The composition preferably comprises at least one thickener, preferably selected from the group consisting of associative thickeners such as modified polyacrylates, modified cellulose ethers, modified polyacrylamides, modified polyethers and associative polyurethane thickeners, modified celluloses, organic polymers such as polyvinyl alcohols, polyacrylic acid and polymethacrylic acids, and copolymers thereof, (modified) polyacrylamides, polyvinylpyrrolidone and polyethylene glycols, natural thickeners such as starch, gelatins, casein or konjac flour and also chemically modified types thereof, and organic thickeners such as metal soaps, hardened castor oil and alkoxylates thereof and chemically modified fat derivatives or else inorganic compounds such as sheet silicates (bentonite, hectorite) or (hydrated) SiO2 particles, which may also be modified.

Typical representatives of acrylate thickeners, of the type ASE (alkali swellable emulsion) are available from Dow, e.g. under the brand name ACRYSOL™ TT, from Münzing, e.g. under the brand name TAFIGEL® AP and from BASF. e.g. under the brand name Rheovis® AS types of BASF.

Known anionically modified acrylamides are from Solenis, Yixing Bluwat or BASF.

An additional aspect of the invention is the use of the composition as a defoamer additive, as a flow control additive and/or as a substrate wetting additive.

A further aspect of the invention is the use of the composition for preparing dispersions, millbases, paints, coatings or printing inks, inkjets, grind resins, pigment concentrates, colour preparations, pigment preparations, filler preparations or coating compositions.

The coating compositions may be solvent-based, solvent-free or water-based coatings or printing ink.

The invention further provides for the use of the compounds based on polybutadienes for preparing a defoamer composition. Having regard to the specific choice conditions for the polyether-modified polybutadienes, reference is made to the foregoing.

The examples which follow are provided merely to elucidate this invention to those skilled in the art and do not constitute any limitation of the described subject matter or of the described process whatsoever.

1. Preparation Examples

General Methods
Gel Permeation Chromatography (GPC):
GPC measurements for determination of polydispersity ($M_w/M_n$), weight-average molar mass ($M_w$) and number-average molar mass ($M_n$) were conducted under the following measurement conditions: SDV 1000/10 000 Å column combination (length 65 cm), temperature 30° C., THF as mobile phase, flow rate 1 ml/min, sample concentration 10 g/l, RI detector, evaluation against polypropylene glycol standard.

Determination of the Content of Epoxy Groups in the Polybutadiene (Epoxy Content, Epoxidation Level)
The content of epoxy groups was determined with the aid of $^{13}$C-NMR spectroscopy. A Bruker Avance 400 NMR spectrometer was used. The samples were for this purpose dissolved in deuterochloroform. The epoxy content is defined as the proportion of epoxidized butadiene units in mol % based on the entirety of all repeat units present in the sample. This corresponds to the number of epoxy groups in the epoxidized polybutadiene divided by the number of double bonds in the polybutadiene used.

Determination of the Acid Value:
The acid value was determined by a titration method in accordance with DIN EN ISO 2114.

Preparation of the Inventive Defoamer Composition
Based on the as yet unpublished European patent application EP 19212066.5 or PCT/EP2020/083013 1.1, the steps a)-c) were carried out. As an example, the first example in each case is described with regard to the weight of the component. The weights used and parameters of the intermediate products and end products can be found in the respective tables.

Step a) Preparation of Epoxidized Polybutadienes
An epoxidized polybutadiene was used to prepare a polybutadiene of the brand name Polyvest® 110 (Evonik) having the structure x=1%, y=24% and z=75%.

Generic Illustration for Example A1:
A 2 L four-necked glass flask was initially charged with 725 g of Polyvest® 110 and 39.2 g of conc. formic acid in 1500 g of chloroform at room temperature under a nitrogen atmosphere. Subsequently, 145 g of 30% $H_2O_2$ solution (30% by weight $H_2O_2$ based on the total mass of the aqueous solution) was slowly added dropwise and then the solution was heated to 50° C. for 10 hours. After the reaction had ended, the mixture was cooled to room temperature, the organic phase was removed and washed four times with dist. $H_2O$. Excess chloroform and residual water were distilled off. 689 g of the product were obtained, which was admixed with 1000 ppm of Irganox® 1135 and stored under nitrogen.

Evaluation by means of $^{13}$C NMR gave an epoxidation level of about 8.8% of the double bonds.

$M_w$=4596 g/mol; $M_n$=1972 g/mol; $M_w/M_n$=2.3

For the other examples, the weights, reaction conditions and evaluations can be found in Table 1. To make it easier to read, the designation of Examples A1-A3 has been retained for Table 2.

TABLE 1

| | | Poly-butadiene [g] | Conc. formic acid [g] | CHCl₃ [g] | 30% H₂O₂ sol. [g] | t [h] | $M_n$ [g/mol] | $M_w$ [g/mol] | $M_w/M_n$ | Degree of epoxidation [%] | Yield [g] |
|---|---|---|---|---|---|---|---|---|---|---|---|
| HR 6009 | A1 | 725 g | 39.2 | 1500 | 145 | 10 | 1972 | 4596 | 2.3 | 8.8 | 689 |
| DZ 2645 | A2 | 750 g | 40.5 | 750 | 150 | 10.5 | 2018 | 4686 | 2.3 | 7.9 | 727 |
| DZ 2647 | A3 | 750 g | 40.5 | 750 | 150 | 10 | 1978 | 4583 | 2.3 | 8.5 | 713 |

Step b) Preparation of Hydroxy-Functional Polybutadienes

The epoxidized polybutadiene A1 from step a) was used to prepare a hydroxylated polybutadiene. The degree of hydroxylation here is the number of OH groups of the hydroxy-functional polybutadiene divided by the number of double bonds in the polybutadiene used in step a). For the preparation, a 2 L four-necked flask under a nitrogen atmosphere was initially charged with 684 g of the epoxidized polybutadiene in 884 g of isobutanol and 80 ppmw of trifluoromethanesulfonic acid (based on mass of epoxidized polybutadiene) with stirring. This was followed by heating to 70° C. and stirring of the mixture at that temperature for 3 hours. The reaction mixture became clear during the reaction. After the reaction had ended, the mixture was cooled to room temperature and the solution was neutralized by adding 10.4 g of sat. NaHCO₃ solution. The mixture was heated to 115° C. and excess water and excess alcohol was distilled off under reduced pressure. The alcohol recovered by distillation and optionally dried may be reused in subsequent syntheses. The isobutanol distilled off may be dried, for example, by distillation or by addition or drying agents such as molecular sieves. 724 g of a brownish product was obtained, which was admixed with 1000 ppm of Irganox® 1135 and stored under nitrogen.

Evaluation by means of ¹³C-NMR showed complete conversion of all epoxy groups, which gives a degree of hydroxylation of ca. 8.8%.

$M_w$=9257 g/mol; $M_n$=2489 g/mol; $M_w/M_n$=3.7

The step was carried out analogously for the other examples; see Table 2.

Step c) Preparation of the Defoamer According to the Invention by Alkoxylation of the Hydroxy-Functional Polybutadiene A 3 litre autoclave was initially charged with 196.0 g of the hydroxy-functional polybutadiene A1 from step b) and 11.1 g of 30% sodium methoxide solution (30% by weight sodium methoxide in methanol based on total mass of the solution) under nitrogen, and the mixture was stirred at 50° C. for 1 hour. Subsequently, the mixture was heated up to 115° C. while stirring and the reactor was evacuated down to an internal pressure of 30 mbar in order to distillatively remove excess methanol and other volatile ingredients present. 540 g of propylene oxide (PO) was metered in continuously and while cooing within 15 h at 115° C. and max. Internal reactor pressure 3.5 bar (absolute). Continued reaction at 115° C. for 30 minutes was followed by degassing. Volatile components such as residual propylene oxide were distilled off under reduced pressure. The product was cooled to 95° C., neutralized with 30% H₃PO₄ to an acid number of 0.1 mg KOH/g, and admixed with 1000 ppm of Irganox® 1135. Water was removed by distillation under reduced pressure and precipitated salts were filtered off. 706 g of the medium-viscous and orange coloured, clear alkoxylated polybutadiene were isolated and stored under nitrogen.

For neutralization with lactic acid, the product was cooled to below 80° C. following vacuum distillation to remove volatile fractions, neutralized with lactic acid to an acid number of 0.1 mg KOH/g, admixed with 1000 ppm Irganox® 1135 and stored under nitrogen.

$M_w$=22 850 g/mol; $M_n$=3160 g/mol; $M_w/M_n$=7.2

TABLE 2

| | Epoxidized polybutadiene [g] from Table 1 | Iso-butanol [g] | sat. NaHCO₃ sol. [g] | t [h] | $M_n$ [g/mol] | $M_w$ [g/mol] | $M_w/M_n$ | Degree of hydroxylation [%] | Yield [g] |
|---|---|---|---|---|---|---|---|---|---|
| A1 | 684 | 684 | 10.4 | 3 | 2469 | 9257 | 3.7 | 8.8 | 724 |
| A2 | 647 | 647 | 9.9 | 5 | 2534 | 10860 | 4.3 | 7.9 | 687 |
| A3 | 675 | 675 | 10.3 | 5 | 2267 | 6722 | 3.0 | 8.5 | 703 |

Further defoamers according to the invention and comparative example were carried out analogously with the weights and reaction conditions listed according to Table 3. The alkoxylation modifications are evident from the "feed profile" column.

number averages unless otherwise stated. Where reference is hereinbelow made to measured values these measured values were determined at a pressure of 101 325 Pa, a temperature of 23° C. and ambient relative humidity of approx. 40% unless otherwise stated.

TABLE 3

Inventive defoamer and comparative example

| Defoamer | Hydroxylated polybutadiene [g] from Table 2 | Feed profile | t [h] | Cat. [g] | Neutralization | $M_n$ [g/mol] | $M_w$ [g/mol] | $M_w/M_n$ | AN [mg KOH/g] | Yield [g] | Physical state |
|---|---|---|---|---|---|---|---|---|---|---|---|
| EA1.1 | 196 of A1 | 540 g PO | 15 | 11.1 | $H_3PO_4$ | 3160 | 22850 | 7.2 | 0.1 | 706 | liquid |
| EA1.2 | 222 of A1 | 368 g PO | 26 | 6.3 | Lactic acid | 3101 | 17415 | 5.6 | 0.1 | 566.4 | liquid |
| EA2 | 172 of A2 | 474 g PO + 72 g EO | 13 | 10.0 | $H_3PO_4$ | 3202 | 25240 | 2.9 | 0.1 | 671 | liquid |
| EA3 | 149 of A3 | 284 g EO/ 161 g PO | 14 | 11.0 | $H_3PO_4$ | 3251 | 24034 | 7.4 | 0.1 | 565 | liquid |
| VGA2 | 211 of A2 | 441 g EO | 5 | 6.0 | $H_3PO_4$ | 3943 | 15406 | 3.9 | 0.1 | 554 | solid |

II. Testing Compatibility and Defoamer Activity

Methods
Viscosity (mPas)
The print viscosity of 16 seconds (DIN 4 cup) is set at 23° C. in accordance with DIN EN ISO 2431.
Compatibility
Compatibility is determined visually using a coating of the formulation to be tested (applied using a spiral film applicator (Erichsen K-Stab number 2)) on a film (Melinex 401 CW from Pütz Follen).
The evaluation is carried out according to the following scale (based on an area of 10×10 cm):
1=surface completely covered with defects
2=surface nearly completely covered with defects
3=surface with very many defects
4=surface with numerous defects
5=surface with isolated defects (up to 50)
6=surface with isolated defects (up to 30)
7=surface with few isolated defects (up to 20)
8=surface with few isolated defects (up to 10)
9=surface with very few isolated defects (1 to 5)
10=surface free from defects
Defoamer Activity
Defoamer activity is determined by means of a stirring test. 50 g of the formulation and the test amount of the defoamer (for example 0.2 g) are weighed into a plastic beaker for this purpose. The defoamer is incorporated for one minute at 1500 rpm using a stirrer (Dispermat type 60/2-457 from VMA Getzmann GmbH) having a toothed dissolver disc (diameter 3 cm, VMA Getzmann GmbH). The formulation is subsequently foamed for 2 minutes at 5000 rpm. 45 g of the formulation are then weighed into a 100 mL graduated glass measuring cylinder and the volume read off. A higher volume denotes a poorer defoamer activity.
Application
The respective coating compositions are applied to a film (Melinex 401 CW from Pütz Follen) with a spiral film applicator (Erichsen K-Stab number 2). Drying is effected at room temperature.
Further Conditions
Where values are expressed in % in the context of the present invention, these are in % by weight unless otherwise stated. In the case of compositions the values reported in % are based on the entire composition unless otherwise stated. Where reference is hereinbelow made to averages these are Materials and Equipment
Dispermat type 60/2-457, VMA Getzmann GmbH
Dissolver disc (diameter 3 cm), VMA Getzmann GmbH
Spiral film applicator (K-Stab number 2), Erichsen
Film (Melinex 401 CW), Pütz Follen
K100 measuring instrument for static surface tension, Krüss
BP 50 measuring instrument for dynamic surface tension. Krüss
Speedmixer DAC 150 FVZ, Hauschild GmbH & Co. KG Comparative Examples Blank Flexographic ink K1 blank reference, for preparation see below
Polyvest 130 Polybutadiene, Evonik
Preparation of the Flexographic Ink
To test compatibility and defoamer activity, a flexographic ink K1 was firstly prepared which is set as a blank reference. Here, the mill-base is mixed with the let-down and homogenized with the aid of a dissolver. By adding distilled water, the blank reference is set to a print viscosity of 18 seconds (DIN 4 cup at 23° C. DIN EN ISO 2431).
To prepare the mill-base of the flexographic ink K1, the liquid binder was initially charged in a grinding vessel in accordance with Table 4. The further liquid components were incorporated and homogenized for 5 minutes at 2.6 m/s (400 rev/min) using a 012.5 cm dissolver disc, then the pigment was added thereto. The mixture was then predispersed at 18-23 m/s (3520 rev/min) using a Ø12.5 cm dissolver disc for 10 minutes at max. 50° C. Finally, after the predispersion, a last portion of the liquid binder was weighed in, which was incorporated at 1800 rev/min for 5 minutes. Using a Ø13 cm double grinding disc and glass beads having a diameter or 2.5 mm, the mixture was dispersed at 10n/s (1470 rev/min) up to a grain fineness of <10 μm. The grain fineness was tested with the aid of a grindometer in accordance with DIN EN ISO 1524. After reaching the grain fineness, distilled water was weighed in and homogenized. Subsequently, sieving was conducted using a metal sieve.

TABLE 4

Formulation of mill-base flexographic ink K1

| Name | Manufacturer | Type | Parts by weight |
|---|---|---|---|
| Joncryl ® HPD 96E | BASF | Binder | 21.15 |
| TEGO ® Foamex 830 | Evonik | Defoamer | 0.47 |
| TEGO ® Dispers 760W | Evonik | Wetting & dispersing additive | 2 |
| Water | | Solvent | 14.72 |
| Irgalite Yellow K 1415 | BASF | Pigment | 35.04 |
| Joncryl ® HPD 96E | BASF | Binder | 11.19 |
| Dist. Water | | Solvent | 15.43 |
| | | Total | 100 |

TABLE 5

Formulation of let-down

| Name | Manufacturer | Type | Parts by weight |
|---|---|---|---|
| Millbase flexographic ink K1 | | Millbase | 42.1 |
| Joncryl ® 90 | BASF | Binder | 21.1 |
| Joncryl ® 77-E | BASF | Binder | 36.8 |
| Dist. Water | | Solvent | To adjust viscosity |
| | | Total | 100 |

The millbase was initially charged according to Table 2 and the further binder of the let-down added and then homogenized at a speed of 1500 rev/min for 20 minutes using a Ø10 cm dissolver disc in the dissolver.

After the homogenization, distilled water was added to adjust viscosity. The print viscosity was adjusted to 16 seconds in the DIN 4 cup at 23° C. in accordance with DIN EN ISO 2431.

The flexographic printing ink K1 was used for further testing.

Preparation of the Inventive Defoamer Emulsion

For the performance testing, the 80.0% by weight inventive defoamers EA1.1, EA1.2, EA2, EA3, comparative examples VGA2 and Polyvest® 130 were converted using non-ionic emulsifiers (mixture of polyoxyethylene fatty alcohol ether and polyoxyethylene triglyceride having a mixture HLB of 13) into a 20% aqueous defoamer emulsion.

A thickener was added in each case to the inventive defoamer emulsions so that the thickener concentration in the defoamer emulsion is for System 1: 0.8% by weight of a commercial acrylate thickener type ASE (alkali-swellable emulsion), for example from Dow, ACRYSOL™ ASE-60, System 2: 0.25% by weight of an anionically modified acrylamide from BASF, Magnafloc Compatibility Testing 50 g of the flexographic printing ink K1 and 0.2 g of the appropriate defoamer emulsion 1 (with system 1) or 2 (with system 2) were weighed into a plastic beaker and foamed as described above. The foam collapse was observed for 90 minutes and then applied to a film as described above and evaluated visually.

Defoamer Activity 50 g of the flexographic printing ink K1 and 0.2 g of the appropriate defoamer emulsion 1 or 2 were weighed into a plastic beaker and foamed as described above. The defoamer effect was tested accordingly.

The results are listed in tables below.

TABLE 6

Defoamer emulsion System 1

| Examples | Chemical modification EO/PO (Mass) | Foam volume [mL/45 g] | Compatibility |
|---|---|---|---|
| Blank flexographic printing ink K1 | | 90 | 10 |
| Polyvest 130 | | 81 | 9 |
| EA1.1 | 0/540 g | 70 | 9 |
| EA1.2 | 0/368 g | 69 | 9 |
| EA2 | 72 g/474 g | 80 | 9 |
| VGA2 | 441 g/0 | 89 | 9 |

The defoamer emulsions according to the invention exhibited a better defoamer effect than the comparative examples.

TABLE 7

Defoamer emulsion System 2

| Examples | Chemical modification EO/PO (Mass) | Foam volume [mL/45 g] | Compatibility |
|---|---|---|---|
| Blank flexographic printing ink K1 | | 90 | 10 |
| Polyvest 130 | | 86 | 9 |
| EA2 | 72 g/474 g | 80 | 10 |
| EA3 | 284 g/161 g | 86 | 10 |
| EA1.1 | 0/540 g | 68 | 10 |

Here, the defoamer emulsions are far superior to the comparative example both in terms of their defoamer effect and in compatibility.

The invention claimed is:

1. A defoamer composition, comprising:
a compound based on polybutadiene having at least one repeat unit selected from the group consisting of divalent radicals

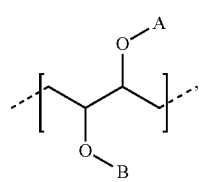

(U)

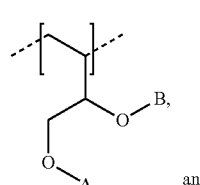

(V)

and

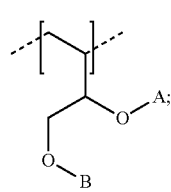

(W)

wherein

A is in each case independently a monovalent organic radical;

B is in each case independently a radical of the formula (4a)

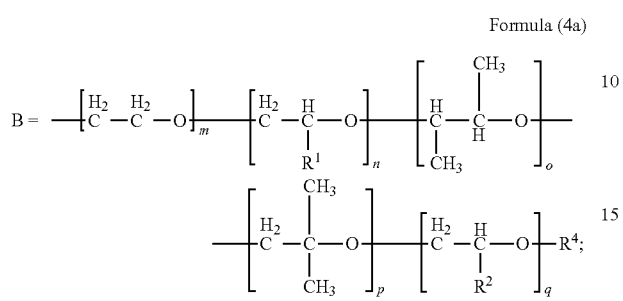

Formula (4a)

$R^1$ is in each case independently a monovalent hydrocarbon radical having 1 to 16 carbon atoms;

$R^2$ is a radical of the formula $\sim CH_2-O-R^3$;

$R^3$ is in each case independently a monovalent hydrocarbon radical having 3 to 18 carbon atoms;

$R^4$ is in each case independently a monovalent organic radical having 1 to 18 carbon atoms or hydrogen;

m, n, o, p and q are each independently 0 to 300, with the proviso that a sum total of m, n, o, p and q is greater than 1; and wherein the B radical has at least one repeat unit in accordance with

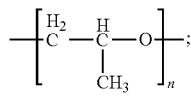

including every permutation of repeat units in B.

2. The composition according to claim 1, wherein m, n, o, p and q are each independently 0 to 200, with the proviso that the sum total of m, n, o, p and q is greater than 1.

3. The composition according to claim 1, wherein a number-average molar mass $M_n$ of the polybutadiene is from 200 g/mol to 20,000 g/mol.

4. The composition according to claim 1, wherein the polybutadiene has 0% to 80% of double bonds present as 1,2 vinyl double bonds, and 20% to 100% of the double bonds present as 1,4 double bonds, wherein the percentages are based on the total number of double bonds in the polybutadiene.

5. The composition according to claim 1, wherein the compound is based on linear polybutadienes.

6. The composition according to claim 1, wherein the compound has no pendant (in comb position) polybutadienes.

7. The composition according to claim 1, wherein the compound has exclusively pendant (in comb position) repeat units (U), (V), and/or (W).

8. The composition according to claim 1, wherein an average molar mass of B is from 40 g/mol to 20,000 g/mol.

9. The composition according to claim 1, wherein the composition comprises the compound in an amount of 2 to 100% by weight, based on a total weight of the composition.

10. The composition according to claim 1, wherein the composition comprises at least one emulsifier.

11. The composition according to claim 1, wherein the composition has a viscosity, measured in a 5% aqueous solution at 20° C. to DIN 53015, of 50-5,000 mPa s.

12. The composition according to claim 1, wherein the composition comprises at least one thickener.

13. The composition according to claim 1, wherein the composition comprises at least one solid.

14. An additive, comprising the composition according to claim 1, wherein the additive is a defoamer additive, a flow control additive, and/or a substrate wetting additive.

15. A method, comprising:
mixing the composition according to claim 1 into a further composition, wherein the further composition is one selected from the group consisting of a dispersion, a millbase, a paint, a coating, a printing ink, an inkjet, a grind resin, a pigment concentrate, a colour preparation, a pigment preparation, a filler preparation, and a coating composition.

16. A method of defoaming, comprising:
adding the composition according to claim 1 into a further composition.

17. The composition according to claim 1, wherein B is in each case independently a radical of the formula (4b)

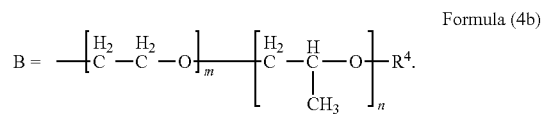

Formula (4b)

18. The composition according to claim 1, wherein B is in each case independently a radical of the formula (4c)

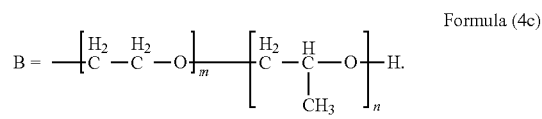

Formula (4c)

19. The composition according to claim 12, wherein the at least one thickener is at least one selected from the group consisting of an associative thickener, a hydrophobically modified polyacrylate (HASE), a hydrophobically modified cellulose ether (HMHEC), a hydrophobically modified polyacrylamide (HMPAM), a hydrophobically modified polyether (HMPE), an associative polyurethane thickener, a modified cellulose, an organic polymer, a polyvinyl alcohol, a polyacrylic acid, a polymethacrylic acid, a polyacrylamide, polyvinylpyrrolidone, a polyethylene glycol, a natural thickener or a chemically modified type thereof, a starch, gelatin, casein, konjac flour, an organic thickener, a metal soap, a hardened castor oil or an alkoxylate thereof, a chemically modified fat derivative, an inorganic compound, a sheet silicate (bentonite, hectorite), and a (hydrated) $SiO_2$ particle or a modified type thereof.

20. The composition according to claim 13, wherein the at least one solid is at least one selected from the group consisting of silica in a modified or unmodified form, a (alkaline earth) alkali metal soap, calcium stearate, and a mixture thereof.

21. The composition according to claim 1, wherein the polybutadiene is essentially free of epoxy groups.

* * * * *